United States Patent
Sturdy (10) Patent No.: US 7,552,442 B1
(45) Date of Patent: Jun. 23, 2009

(54) MILITARY DATA LINK INTEGRATION APPARATUS AND METHOD

(75) Inventor: James T. Sturdy, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 1432 days.

(21) Appl. No.: 10/766,601

(22) Filed: Jan. 27, 2004

(51) Int. Cl.
G06F 13/00 (2006.01)

(52) U.S. Cl. .................. 719/313; 719/328; 707/100

(58) Field of Classification Search ........... 719/313, 719/328; 707/100
See application file for complete search history.

(56) References Cited

U.S. PATENT DOCUMENTS

| | | | |
|---|---|---|---|
| 5,892,765 A * | 4/1999 | Shapard et al. ............. | 370/401 |
| 6,779,009 B1 * | 8/2004 | Zuber ......................... | 708/422 |
| 6,907,434 B2 * | 6/2005 | Maleport et al. ........... | 707/104.1 |
| 7,354,567 B2 * | 4/2008 | Arano et al. ............... | 424/1.21 |
| 2003/0158963 A1 | 8/2003 | Sturdy et al. | |
| 2003/0229603 A1 | 12/2003 | Childress et al. | |
| 2004/0039743 A1 * | 2/2004 | Maleport et al. ........... | 707/10 |
| 2004/0174822 A1 * | 9/2004 | Bui ............................ | 370/252 |

OTHER PUBLICATIONS

Data Link Interface Processor; Thales Communications; KRPLUS (22611) Leaflet; 2 pages.
Ho, H.T., Windows NT Multi-Threaded Design In a Multi-Link Translator and Display System; 1999 IEEE; 07-7803-5749-3/99 3.1.1-1—3.A.1-5.
PCT International Search Report (Form PCT/ISA/210); PCT/US2005/003050; Feb. 7, 2006.

* cited by examiner

*Primary Examiner*—Andy Ho
(74) *Attorney, Agent, or Firm*—McDonnell Boehnen Hulbert & Berghoff LLP (57) ABSTRACT

The military data link integration solution provides a common and reusable approach to interface tactical data link radios with legacy subsystems on each unique military platform. The solution implements the full Link 16 J-Series message set. Enhancements are provided that allow the military user to activate or deactivate specific messages for each unique platform and to customize message processing and display selections through user defined instructions. The solution also provides the capability to automatically re-configure itself for subsystem interfaces and the integration of subsystem functions on each unique platform without the need to modify the product.

20 Claims, 6 Drawing Sheets

MILITARY DATA LINK INTEGRATION APPARATUS AND METHOD

BACKGROUND OF THE INVENTION

1. Field of the Invention (Technical Field)

The present invention relates to digital messaging and more particularly to the integration of legacy and new mission display systems with the military data link radios and the implementation of the Link 16 message set defined by MIL-STD-6016 and associated message processing capabilities.

2. Background Art

The military uses various tactical data link radios to send and receive digital voice and data between their air, land, sea and space vehicles, and command and control facilities. On each vehicle and in each command and control facility, these data link radios are interfaced to various mission computers and display systems. The data transmitted across these data link radios consists of messages, message formats, and message protocols defined by various message standards. The mission and display systems use the data contained in these messages from external sources and generate the data put into these messages sent to external systems.

Some examples of military data link radios are UHF line of sight (LOS) radios, UHF DAMA SATCOM, EHF MDR SATCOM, HF radios, Joint Tactical Information Distribution System (JTIDS), Multi-function Information Distribution System (MIDS), and Joint Tactical Radio System (JTRS). Military data link message standards can be Link 4, Link 11, Link 16, Link 22, and the Variable Message Format (VMF). Examples of mission and display systems are vehicle controls and displays equipment, mission computers, workstations, and network servers.

The Department of Defense (DoD) has recently selected the Link-16 data link message set (in accordance with MIL-STD-6016) as the standard for use on military platforms for tactical data link operations. In addition, the DoD is currently developing the Joint Tactical Radio System (JTRS) to use as the standard data link radio system. Each existing (legacy) and future military platform will use the JTRS with the Link 16 message set for its tactical data link capability.

As outlined in the DoD Command, Control, Communications, Computers, and Intelligence (C4I) Joint Tactical Data Link Management Plan (dated June 2000), a wide range of legacy military platforms will be upgraded to incorporate the JTRS with the Link-16 message set through 2015 and beyond. These same legacy platforms are currently deployed with existing subsystems that generate information used by or consume information provided by various existing and disparate military data link systems. When the new JTRS equipment is introduced into these legacy platforms, there will be a need to interface the existing platform subsystems with the new JTRS equipment. Also, each existing subsystem will need to be upgraded to utilize the new and evolving Link 16 message set.

Since most of these existing platform subsystems were developed in the past, they either implement a subset of the Link 16 message set, or they implement a different and older data link message set such as Link 4 or Link 11. Also, many existing subsystems were designed to interface with older data link radio equipment and are not compatible with the newer data link radio equipment and message processing protocols. Each of these prior art systems are point solutions unique to the specific platform they are implemented on, and they are each provided by a specific company. These point solutions include receive, transmit, and processing functions. Receive functions receive the message from the data link radio, decode the message data, and send the data to the appropriate subsystem. Transmit functions collect specific data from platform subsystems, encode the data into the proper message format, and send the message to the data link radio. Processing functions act on selected data elements to perform specific tasks such as filtering, correlation, keeping track files, and other mission specific functions. Each solution only implements the subset of messages required for that platform's mission. When future changes are needed because the military wants to add, delete or modify specific messages and message processing for the platform, the military must return to the previous point solution company and pay them to implement the changes. Thus, the existing product solutions do not provide the military with the capability of modifying specific messages without a major product redesign on each unique platform. For example, on fighter aircraft the mission computer interfaces to the existing data link radio and performs the message processing for the message subset implemented on the specific fighter. The display system also processes those messages that contain situational awareness information, but tailors it for the specific fighter mission and display requirements.

There are many different implementations of data link integration used in the United States military aircraft as well as NATO countries. Each of these are point solutions that were designed specifically for the aircraft they are used on. A specific example is the Data Link Interface Processor (DLIP) provided by Thales Communications. However, these existing implementations do not offer the benefits of the Military Data Link Integration Application:

They only implement a subset of the full J-Series message set.

They are not user programmable. Any addition or deletion of messages or special message processing functions requires redesign of the operational software.

They do not use API databases to allow I/O re-configuration without modification.

They do not provide standard display system interfaces and video outputs.

As a result, the upgrade costs for these existing platform subsystems will be enormous if traditional subsystem upgrade approaches are used. Traditional upgrade approaches involve point solutions and upgrades by different integrators on each platform application. A need exists for a common and low cost military data link integration (MDLI) product that can be used in multiple and disparate platform applications.

SUMMARY OF THE INVENTION

Disclosure of the Invention

The present invention implements a common scalable design that can be used on each and every platform application. The invention implements the complete or full Link 16 J-Series message set with a database driven design so that the military user can control message activation, message deactivation, and message processing instructions for each platform application. The database used for this capability is created by and maintained by the military user. The military does not need to pay any company to do this for them. This allows the common MDLI product to work on each unique platform without the need to recompile the operational software.

The present invention implements a database driven design that allows automatic re-configuration of the MDLI product for each unique platform without the need for software changes to the product. The database used for this capability contains the interface instructions for each type of subsystem used on each unique platform and allows the common MDLI product to work on each unique platform without the need to recompile the operational software.

The present invention implements special message processing functions. These functions provide correlation of similar data from disparate sources, target track files, formatting of data into situational awareness display formats, automatic event triggers and associated actions, automatic triggers for transmit messages, mission recording and playback, and others. In addition, the present invention provides standard video outputs for Link 16 display formats.

A primary object of the present invention is to provide a common scalable design that can be used on each and every platform application One advantage of the Military Data Link Integration Application is that it provides the military with a low cost solution. The user can tailor how the Military Data Link Integration Application works on each unique host platform simply by updating the Applications Programming Interface (API) Databases and User Modifiable Instructions (UMI) Databases. This gives the user control over the use and operation of the solution without the need to pay someone to modify it for them.

Another advantage of the Military Data Link Integration Application is that it is flexible, scalable, and reusable for each unique host platform. Through the API Database it can be used on multiple unique host platforms to interface with available communications subsystems and legacy subsystems without any required modifications.

Yet another advantage of the Military Data Link Integration Application is that it implements the complete set of Link 16 messages and processing rules defined in MIL-STD-6016. The user can then activate or deactivate messages as required for each unique host platform.

Another advantage of the Military Data Link Integration Application is that it implements special message processing functions and utilities that can be activated or deactivated by the user. These message processing functions and utilities allow the user to add value to the data and messages sent by the Military Data Link Integration Application to available communications subsystems and legacy subsystems on the host platform.

Another advantage of the Military Data Link Integration Application is that it provides standard display system interfaces to support flexible and user programmable display formats to view Link 16 data and legacy subsystem data.

Another advantage of the Military Data Link Integration Application is the Ground Based Software Tool that allows users to define and create the API Databases and UMI Databases on a workstation in an office environment.

Another advantage of the Military Data Link Integration Application common solution is that is saves the user money on training and maintenance costs across all host platforms.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

Figure 1:
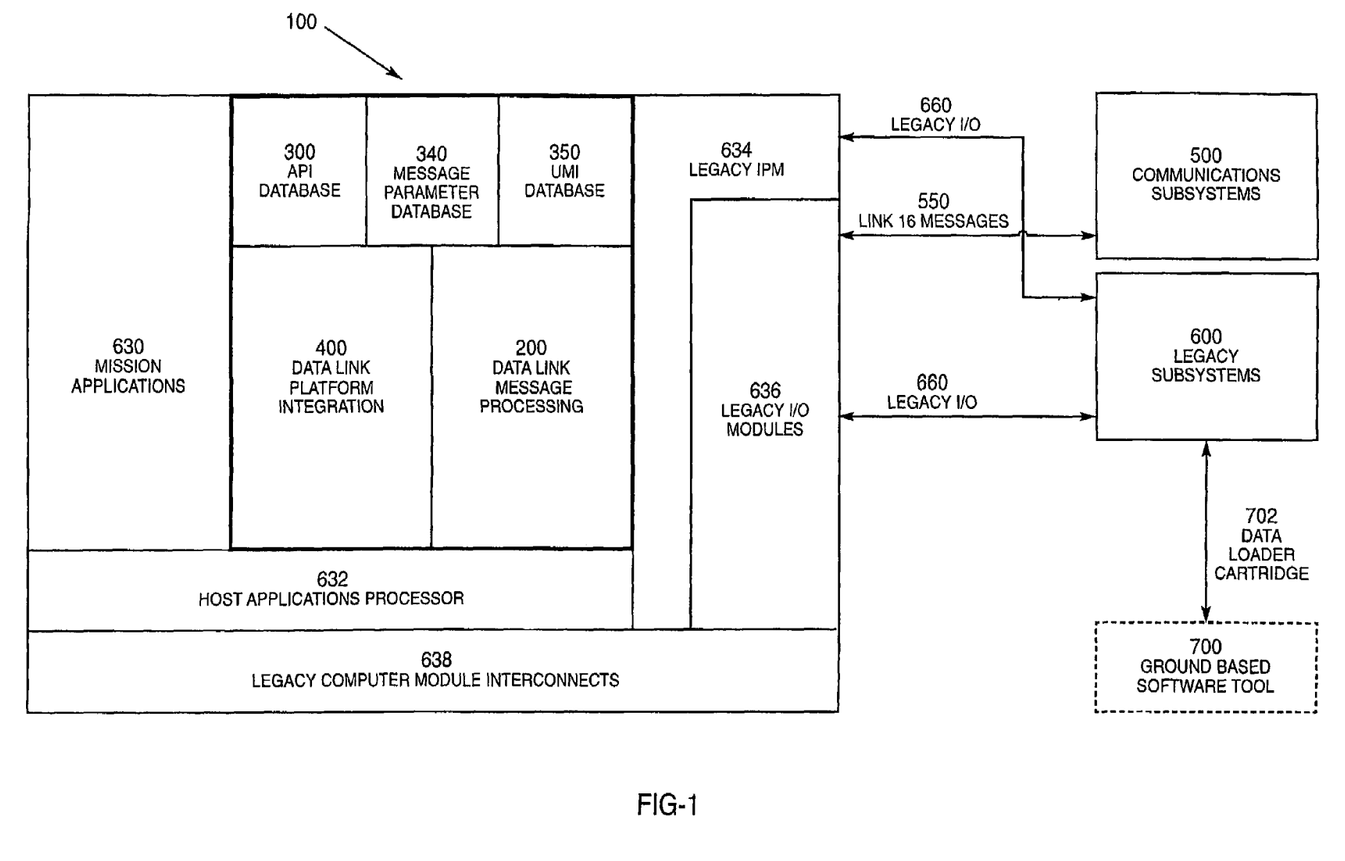
FIG. 1 depicts the military data link integration application implantation on a host processor.

The Military Data Link Integration Application is a software partition that executes on a host processor. FIG. 1 illustrates how the Military Data Link Integration Application 100 software partition is implemented. This same implementation is envisioned for each platform in which the Military Data Link Integration Application is used. The Military Data Link Integration Application consists of the following functions: Data Link Message Processing 200, Data Link Platform Integration 400, Application Programming Interface (API) Database 300, Message Parameter Database 340, and User Modifiable Instructions (UMI) Database 350. These Military Data Link Integration Application functions (200 through 400) are implemented in a computer system available on each host platform. The host computer system is expected to consist of a Host Applications Processor 632 module, Legacy Image Processing Module (IPM) 634, Legacy Input and Output (I/O) Modules 636, and a computer cabinet with the necessary Legacy Computer Module Interconnects 638. The Military Data Link Integration Application functions (200 through 400) execute on the Host Applications Processor 632 and interface with legacy software Mission Applications 630 that are also executing on the Host Applications Processor 632 through pre-defined API data exchange protocols in the API Database 300. The Military Data Link Integration Application functions (200 through 400) also interface with external Communications Subsystems 500 and other Legacy Subsystems 600 through the host computer system Legacy IPM 634, Legacy I/O Modules 636, and their associated Legacy Computer Module Interconnections 638. The pre-defined data exchange protocols consist of host computer system port addresses, message structures and formats, and data exchange command sequences. The Military Data Link Integration Application functions (200 through 400) utilize these host computer resources (632, 634, 636 and 638) to exchange data with external subsystems (500 and 600) over pre-defined system interfaces Legacy I/O 660 and Link 16. Messages 550. Additionally, the Military Data Link Integration Application databases (300 and 350) can be created off the platform on a Ground Based Software Tool 700. These databases can then be uploaded to the Host Application Processor 632 memory through a data loader within the Legacy Subsystems 600 using a Data Loader Cartridge 702. These databases (300 and 350) are used by the Data Link Message Processing 200 and Data Link Platform Integration 400 functions to automatically configure the Military Data Link Integration Application on the host platform, and to implement user defined instructions.

Figure 2:
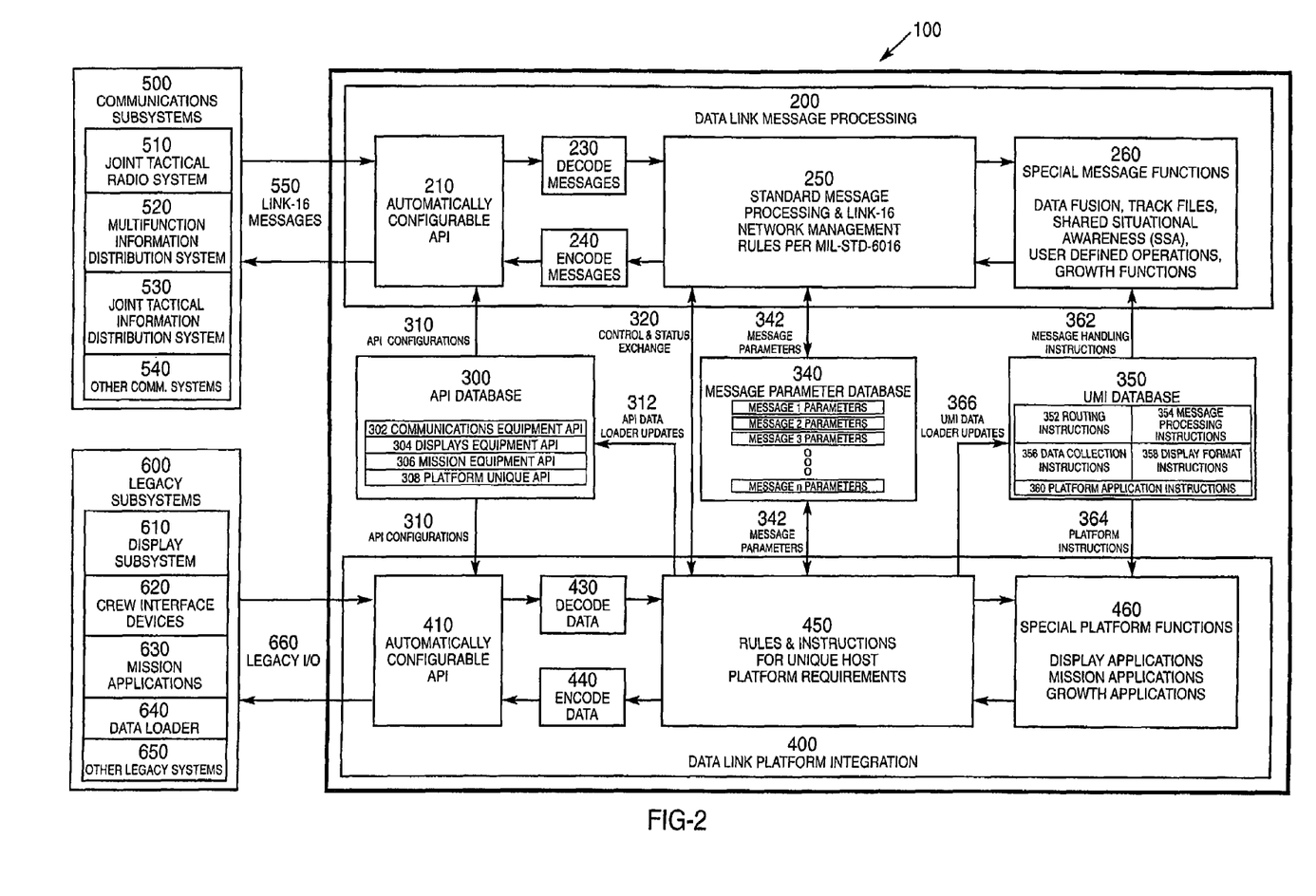
FIG. 2 is a flow chart that shows the preferred military data link integration application.

FIG. 2 illustrates the Military Data Link Integration Application 100 approach consisting of its major functions Data Link Message Processing 200 and Data Link Platform Integration 400. It also includes the API Database 300, the Message Parameter Database 340, and the User Modifiable Instructions (UMI) Database 350. The Data Link Message Processing 200 function implements the Link 16 message set with its processing rules and special message functions. It interfaces with the Communications Subsystems 500 on the host platform, databases (300, 340 and 350), and the Data Link Platform Integration 400 function. The Data Link Platform Integration 400 function implements the rules and instructions needed to interface with and interact with the various Legacy Subsystems 600 on the host platform, as well as Special Platform Functions 460, under the control of the Data Link Message Processing 200 function. Control is accomplished through the Control and Status Exchange 320 interface. The Data Link Platform Integration 400 function also implements the data loader function that is used to update the API Database 300 and the UMI Database 350 using the host platform's Data Loader 640 device.

Figure 3:
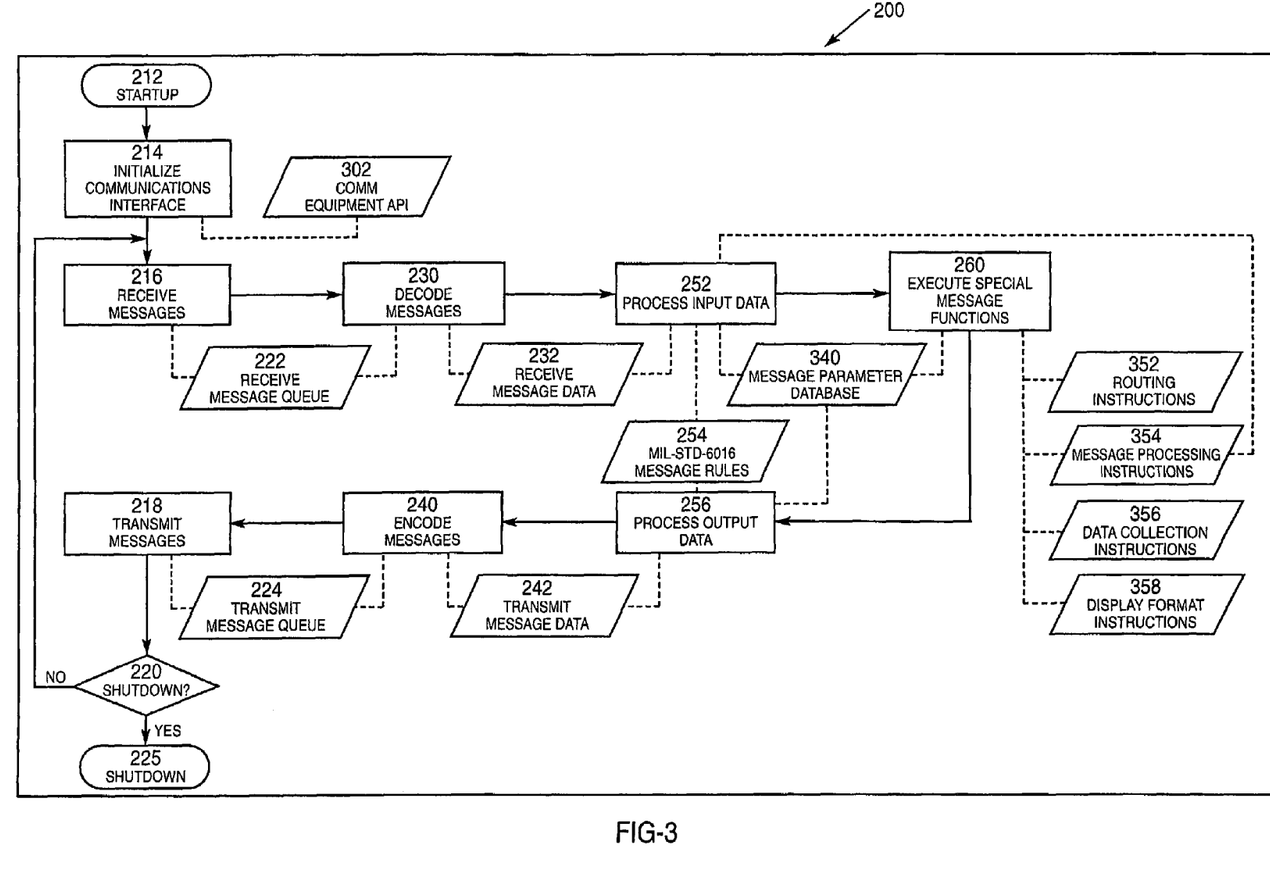
FIG. 3 is a flow chart showing the data link message processing flow.

FIG. 3 provides the Data Link Message Processing 200 functional flow chart. The processing flow illustrated in FIG. 3 implements the functions 210 through 260 identified on FIG. 2. The Automatically Configurable API 210 function shown on FIG. 2 is implemented in processes 212 through 224 of FIG. 3. The Decode Messages 230 function shown on FIG. 2 is implemented in processes 230 and 232 of FIG. 3. The Encode Messages 240 function shown on FIG. 2 is implemented in processes 240 and 242 of FIG. 3. The function Standard Message Processing and Link 16. Network Management Rules per MIL-STD-6016 250 shown on FIG. 2 is implemented in processes 252 through 256 of FIG. 3. The Special Message Functions 260 shown on FIG. 2 is implemented in process 260 of FIG. 3.

The Data Link Message Processing 200 function processing flow is as follows. As shown in FIG. 3, Startup 212 occurs after application of power when the Host Applications Processor 632 (FIG. 1) initiates the execution of the Data Link Message Processing 200 function. The Initialize Communications Interface 214 task is executed to establish the interfaces to the Communications Subsystems 500 using pre-defined instructions in the Communications Equipment API 302 database obtained through the API Configurations 310 interface (FIG. 2). This database contains the instructions to identify which Communications Subsystems 500 are available on the host platform. The database also provides Host Applications Processor 632 interface port addresses and protocols, message structures and formats, and command sequences to accomplish data exchange for each of the available communications subsystems (510 through 540). After initialization is complete, Receive Messages 216 task is executed to poll each available Communications Subsystem (510 through 540) for incoming Link 16. Messages 550. These incoming messages are received into Receive Message Queue 222. Decode Messages 230 task is then executed to unpack each received message in Receive Message Queue 222 and extract the data contained within each message. The extracted data is placed in Receive Message Data 232 storage area. Process Input Data 252 task is then executed to process incoming Link 16 data in accordance with the message processing rules defined in MIL-STD-6016 254. All Link 16 message processing rules are contained in MIL-STD-6016 Message Rules 254 data storage area. Process Input Data 252 task uses pre-defined Message Processing Instructions 354 to determine which Link 16 messages have been activated for the host platform and then uses the appropriate MIL-STD-6016 Message Rule 254 on received message data 232. Message parameters obtained from incoming data are stored in Message Parameter Database 340. Execute Special Message Functions 260 task is then executed. Execute Special Message Functions 260 task uses Data Collection Instructions 356 to identify data parameters to be collected from Legacy Subsystems 600 on the host platform. These collected data parameters are stored in Message Parameter Database 340. Execute Special Message Functions 260 task uses Message Processing Instructions 354 to activate utilities on user specified data parameters. These utilities include data fusion algorithms, creation and update of track files, creation and update of shared situational awareness (SSA) information, and other user defined data operations. The results of these utility operations are stored in Message Parameter Database 340. Execute Special Message Functions 260 task uses Routing Instructions 352 to identify data in Message Parameter Database 340 to be sent to specific Legacy Subsystems 600 and Communications Subsystems 500. Execute Special Message Functions 260 task uses Display Format Instructions 358 to format selected data in Message Parameter Database 340 for display. Process Output Data 256 task is then executed. This task formats the data tagged in Message Parameter Database 340 for output to available Communications Subsystems 500. The tagged data is formatted in accordance with MIL-STD-6016 Message Rules 254, and then is placed in Transmit Message Data 242 buffer. Encode Messages 240 task is then executed to encode the output data into the appropriate message format and to place these formatted messages in Transmit Message Queue 224. Transmit Messages 218 task is then executed to send each transmit message to the appropriate Communications Subsystem (510, 520, 530, or 540). A check is made to decide if it is time to Shutdown 220. If not, then Data Link Message Processing 200 function repeats itself by starting again with Receive Message 216 task. This process is repeated at a pre-defined update rate. Otherwise, Data Link Message Processing 200 function is Shutdown 222.

Figure 4:
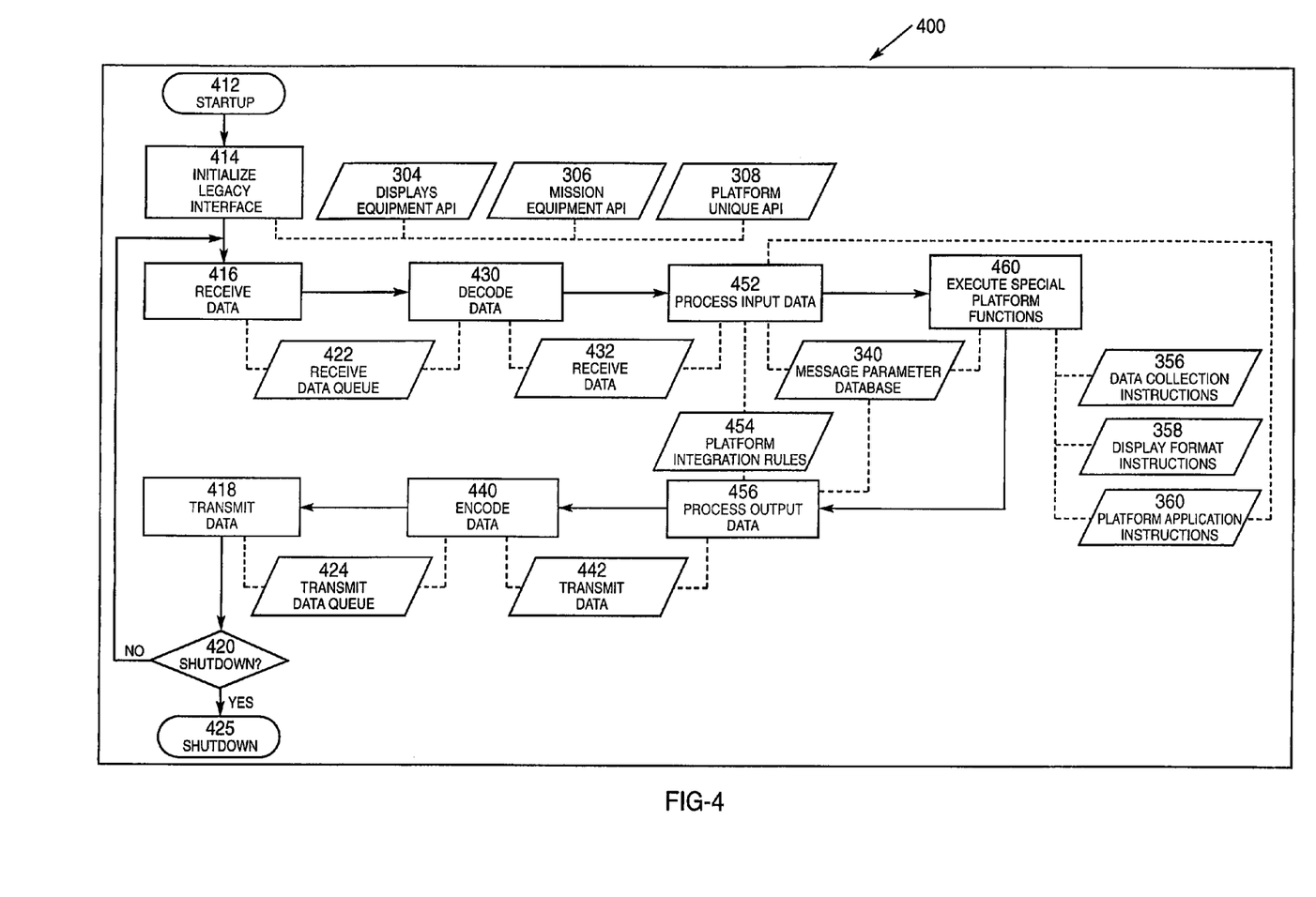
FIG. 4 is a flow chart showing the data link platform integration processing flow.

FIG. 4 provides the Data Link Platform Integration Processing 400 functional flow chart. The processing flow illustrated in FIG. 4 implements the functions 410 through 460 identified on FIG. 2. Automatically Configurable API 410 function (FIG. 2) is implemented in processes 412 through 424 of FIG. 4. Decode Data 430 function (FIG. 2) is implemented in processes 430 and 432 in FIG. 4. Encode Data 440 function (FIG. 2) is implemented in processes 440 and 442 of FIG. 4. Function Rules and Instructions for Unique Host Platform Requirements 450 (FIG. 2) is implemented in processes 452 through 456 of FIG. 4. Special Platform Functions 460 (FIG. 2) is implemented in process 460 of FIG. 4.

Data Link Platform Integration Processing 400 function processing flow is as follows. Startup 412 occurs after application of power when Host Applications Processor 632 (FIG. 1) initiates the execution of Data Link Platform Integration Processing 400 function. Initialize Legacy Interfaces 414 task is executed to establish the interfaces to Legacy Subsystems 600 using pre-defined instructions in the Displays Equipment API 304 database, Mission Equipment API 306 database, and Platform Unique API 308 database using API Configurations 310 interface (FIG. 2). These databases contain the instructions to identify which Legacy Subsystems 600 are available on the host platform. These databases also provide Host Applications Processor 632 interface port addresses and protocols, message structures and formats, and command sequences to accomplish data exchange for each of the available legacy subsystems (610 through 650). After initialization is complete, Receive Data 416 task is executed to poll each available Legacy Subsystem (610 through 650) for incoming Legacy I/O 660. The incoming data is received into Receive Data Queue 422. Decode Data 430 task is then executed to unpack each received data item in Receive Data Queue 422 and extract the data from the legacy subsystem message format. The extracted data is placed in Receive Data 432 buffer. Process Input Data 452 task is then executed to process incoming data in accordance with Platform Integration Rules 454. Process Input Data 452 task uses pre-defined Platform Application Instructions 360 to determine which legacy subsystems have been activated for the host platform and then uses the appropriate Platform Integration Rules 454 on Receive Data 432. Message parameters obtained from incoming data are stored in Message Parameter Database 340. Execute Special Platform Functions 460 task is then executed. Execute Special Platform Functions 460 task uses Data Collection Instructions 356 to identify data parameters to be collected from Legacy Subsystems 600 on the host platform. These collected data parameters are stored in Message Parameter Database 340. Execute Special Platform Functions 460 task uses Platform Application Instructions 360 to activate utilities on user specified data parameters. These utilities include display applications, mission applications, and other user defined data operations. The results of these utility operations are stored in Message Parameter Database 340. Execute Special Platform Functions 460 task uses Display Format Instructions 358 to format selected data in Message Parameter Database 340 for display. Process Output Data 456 task is then executed. This task formats the data tagged in Message Parameter Database 340 for output to available Legacy Subsystems 600. The tagged data is formatted in accordance with Platform Integration Rules 454, and then is placed in Transmit Data 442 buffer. Encode Data 440 task is then executed to encode the output data into the appropriate message format and to place these formatted messages in Transmit Data Queue 424. Transmit Data 418 task is then executed to send each transmit data message to the appropriate Legacy Subsystem (610, 620, 630, 640 or 650). A check is made to determine if it is time to Shutdown 420. If not, then Data Link Platform Integration Processing 400 function repeats itself by starting again with Receive Data 416 task. This process is repeated at a pre-defined update rate. Otherwise, Data Link Platform Integration Processing 400 function is Shutdown 425.

A capability of the Military Data Link Integration Application is the ability to automatically initialize its interfaces to Communications Subsystems 500 on the host platform. This capability allows the Military Data Link Integration Application to be hosted on many different host platforms without the need to modify it for different communications equipment configurations. Automatically Configurable API 210, shown on FIG. 2, uses Communications Equipment API 302 database to obtain instructions to identify which Communications Subsystems (510 through 540) are available on the host platform. Communications Equipment API 302 database also provides Host Applications Processor 632 (FIG. 1) interface port addresses and protocols, message structures and formats, and command sequences to accomplish data exchange for each of the available communications subsystems (510 through 540). Communications Equipment API 302 database is created off the platform using Ground Based Software Tool 700 shown in FIG. 1. Ground Based Software Tool 700 is provided on a workstation in an office environment. This tool is used to define the interface port addresses and protocols, message structures and formats, and command sequences to accomplish data exchange for each of the communications subsystems available on a specific platform and to create the associated Communications Equipment API 302 database for the host platform. This Communications Equipment API 302 database is then copied to a Data Loader Cartridge 702 (FIG. 1). Data Loader Cartridge 702 is then used on the host platform to load Communications Equipment API 302 database into Military Data Link Integration Application API Database 300 storage area through host platform Data Loader 640 shown in FIG. 2. The instructions in Communications Equipment API 302 database are used by Initialize Communications Interface 214 task (FIG. 3) to automatically configure Data Link Message Processing 200 functions for the host platform communications subsystems (510 through 540 in FIG. 2). Communications Equipment API 302 database is also used by Receive Messages 216 task and Transmit Messages 218 task to automatically configure these tasks to exchange incoming and outgoing messages with the available host platform communications subsystems (510 through 540).

Another capability of the Military Data Link Integration Application is the ability to automatically initialize its interfaces to Legacy Subsystems 600 on the host platform. This capability allows the Military Data Link Integration Application to be hosted on many different host platforms without the need to modify it for different legacy mission and displays equipment configurations. Automatically Configurable API 410 (FIG. 2) uses Displays Equipment API 304 database, Mission Equipment API 306 database, and Platform Unique API 308 database to obtain instructions to identify which legacy subsystems (610 through 650) are available on the host platform. The databases (304, 306 and 308) also provide Host Applications Processor 632 (FIG. 1) interface port addresses and protocols, message structures and formats, and command sequences to accomplish data exchange for each of the available legacy subsystems (610 through 650). The instructions in the databases (304, 306 and 308) are used by Initialize Legacy Interfaces 414 task, shown in FIG. 4, to automatically configure Data Link Platform Integration Processing 400 functions for the host platform legacy subsystems (610 through 650 in FIG. 2). The databases (304, 306 and 308) are also used by Receive Data 416 task and Transmit Data 418 task to automatically configure these tasks to exchange incoming and outgoing data with the available host platform legacy subsystems (610 through 650).

Another capability of the Military Data Link Integration Application is the ability to implement user specified instructions associated with Link 16 message processing and unique host platform functions. This capability allows the user to tailor how Link 16 messages are processed, to define special message processing functions, and to define special platform integration functions without the need to modify the Military Data Link Integration Application for each host platform configuration. Several databases are used to implement this capability. These databases, shown on FIG. 2, are Routing Instructions 352 database, Message Processing Instructions 354 database, Data Collection Instructions 356 database, Display Format Instructions 358 database, and Platform Application Instructions 360 database. Routing Instructions 352 database provides instructions that identify data to be routed and the associated source and destination information. Source instructions identify the Link 16 message in which the data is contained or the legacy subsystem that provides the data. Destination instructions identify the Link 16 message in which the data is required or a legacy subsystem that required the data. Execute Special Message Functions 260 task, shown in FIG. 3, uses Routing Instructions 352 database to identify and tag source data in Message Parameter Database 340, shown in FIG. 2, to be sent to specific legacy subsystems (610 through 650) and communications subsystems (510 through 540). The source data tagged for Link 16 messages is then processed by Process Output Data 256 task (FIG. 3), Encode Messages 240 task (FIG. 3) and Transmit Messages 218 task (FIG. 3). This data is incorporated into Link 16 messages that are sent to the available communications subsystems (510 through 540). The source data tagged for legacy subsystems is then processed by Process Output Data 456 task (FIG. 4), Encode Data 440 task (FIG. 4) and Transmit Data 418 task (FIG. 4). This data is incorporated into messages that are sent to the available legacy subsystems (610 through 650). Message Processing Instructions 354 database provides instructions that identify which Link 16 messages to activate or deactivate, and which utility functions to activate for specific data items. Message Processing Instructions 354 database is used by Process Input Data 252 task, (FIG. 3), to identify which Link 16 messages have been activated for the host platform and then uses the appropriate MIL-STD-6016. Message Rules 254 on received message data 232. Message parameters obtained from incoming messages are stored in Message Parameter Database 340. Execute Special Message Functions 260 task also uses Message Processing Instructions 354 database to activate utilities on user specified data parameters. These utilities include data fusion algorithms, creation and update of track files, creation and update of shared situational awareness (SSA) information, and other built-in data operations. The results of these utility operations are stored in Message Parameter Database 340. Data Collection Instructions 356 database provides instructions that identify what data is to be collected from the available communications subsystems (510 through 540) and legacy subsystems (610 through 650). Data Collection Instructions 356 database is used by Execute Special Message Functions 260 task, (FIG. 3), to identify data parameters to be collected from available communications subsystems (510 through 540) on the host platform. These collected data parameters are stored in Message Parameter Database 340. Data Collection Instructions 356 database is also used by Execute Special Platform Functions 460 task, (FIG. 4), to identify data parameters to be collected from legacy subsystems (610 through 650) on the host platform. These collected data parameters are stored in Message Parameter Database 340. Display Format Instructions 358 database provides instructions that identify what data needs to be formatted for display and what display formats to send to Display Subsystem 610. Display Format Instructions 358 database is used by Execute Special Message Functions 260 task (FIG. 3) to identify Link 16 message data in Message Parameter Database 340 that needs to be formatted, and what formatting instruction to use. The formatted data is placed in Message Parameter Database 340. Display Format Instructions 358 database is also used by Execute Special Platform Functions 460 task (FIG. 4) to identify legacy subsystem data in Message Parameter Database 340 that needs to be formatted, and what formatting instruction to use. The formatted data is placed in Message Parameter Database 340. The formatted display data and selected display format information contained in Message Parameter Database 340 is then used by Process Output Data 456 task, Encode Data 440 task, and Transmit Data 418 task to send the formatted display data and selected display format information to Display Subsystem 610 (FIG. 2) on the host platform. Platform Application Instructions 360 database provides instructions that identify which platform utility functions to activate. Process Input Data 452 task (FIG. 4) uses pre-defined Platform Application Instructions 360 to determine which legacy subsystems have been activated for the host platform and then uses the appropriate Platform Integration Rules 454 on Receive Data 432. Message parameters obtained from incoming data are stored in Message Parameter Database 340. Execute Special Platform Functions 460 task also uses Platform Application Instructions 360 database to activate utilities on user specified data parameters. These utilities include display applications, mission applications, logic operations, preferred channel selections, service operational preference tables, mission record and playback, and other user defined data operations. The results of these utility operations are stored in Message Parameter Database 340. Another capability of the Military Data Link Integration Application is the ability to create its databases (302 through 308 and 352 through 360) off the host platform using Ground Based Software Tool 700 shown in FIG. 1. Ground Based Software Tool 700 is provided on a workstation in an office environment. This tool is used to collect information, to define and create data and data structures, and to define and create the associated instructions required in each database (302 through 308 and 352 through 360). Once created, the databases (302 through 308 and 352 through 360) are then copied to a Data Loader Cartridge 702 (FIG. 1). Data Loader Cartridge 702 is then used on the host platform to load the individual databases (302 through 308 and 352 through 360) into API Database 300 storage area and UMI Database 350 storage area through host platform Data Loader 640 shown in FIG. 2.

Since the Military Data Link Integration Application is a software partition, it can be implemented in an existing computer system on the host platform as illustrated in FIG. 1. It can also be hosted on a General Purpose Processor module 680 illustrated in FIG. 5, or an Image Processing Module 690 illustrated in FIG. 6.

Figure 5:
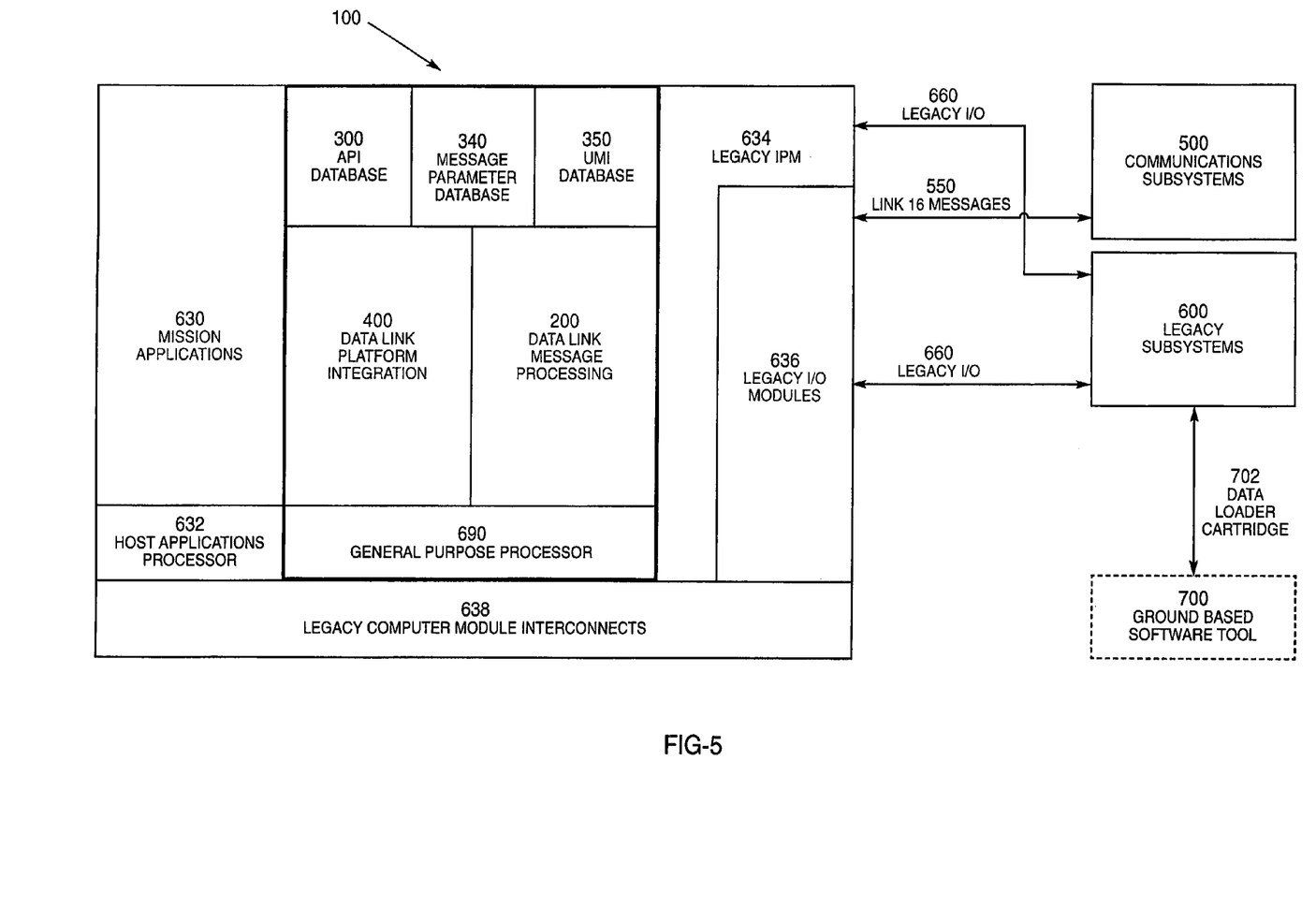
FIG. 5 shows the military data link integration application hosted on a general purpose processor module.

In FIG. 5 API Database 300 is used to define the interfaces between Military Data Link Integration Application and Mission Applications 630 executing on Host Applications Processor 632. API Database 300 is also used to define the interfaces to Legacy IPM 634 and Legacy I/O Modules 636.

Figure 6:
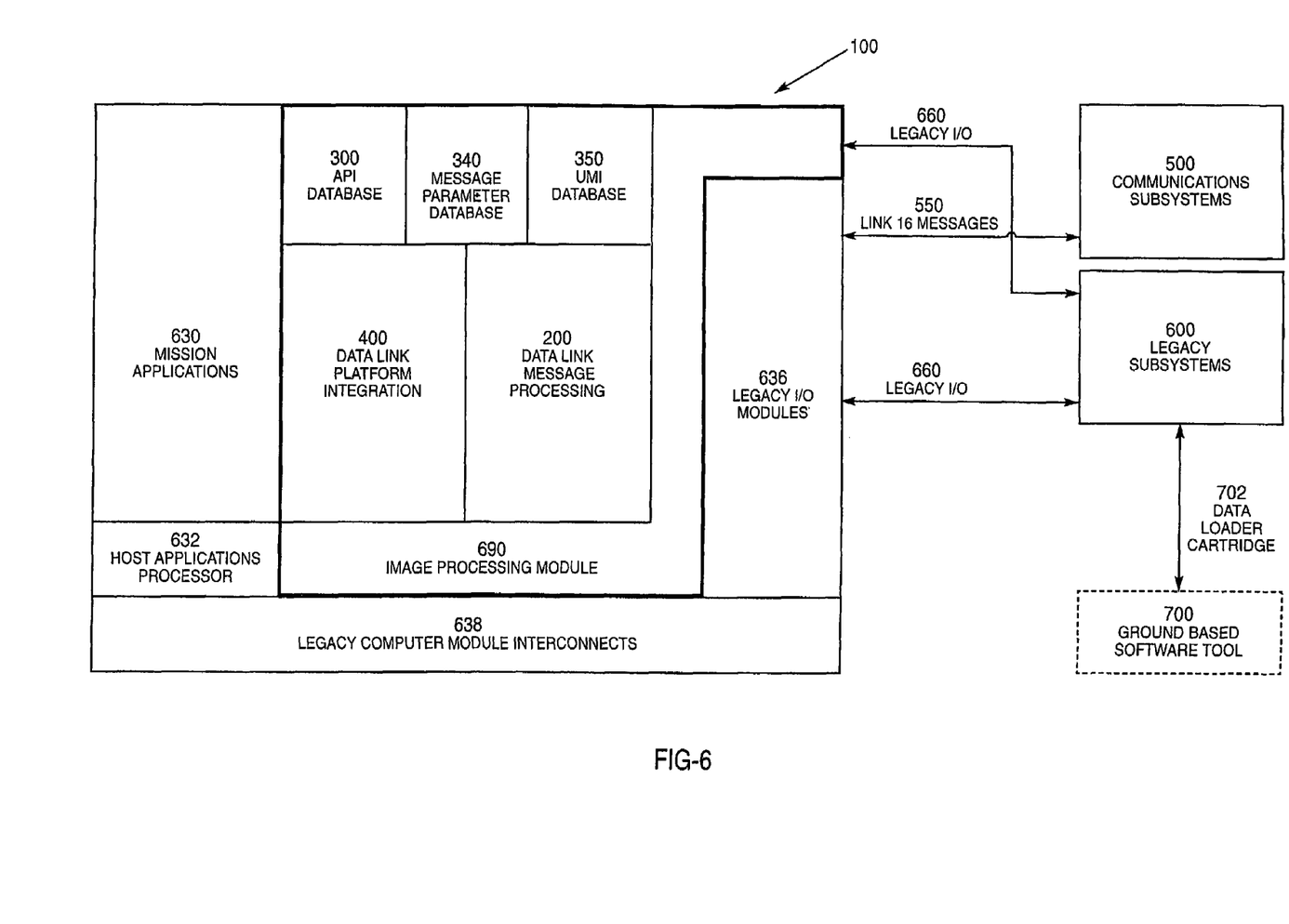
FIG. 6 shows the military data link integration application hosted on an image processing module.

In FIG. 6 API Database 300 is used to define the interfaces between the Military Data Link Integration Application and Mission Applications 630 executing on Host Applications Processor 632. API Database 300 is also used to define the interfaces to Legacy I/O Modules 636. Legacy IPM 634 is eliminated because it is replaced with Image Processing Module 690.

The advantage of hosting the Military Data Link Integration Application on a General Purpose Processor module or an Image Processing Module is that these provide more flexibility in implementing the Military Data Link Integration Application on host platforms that do not have an existing computer system. In the alternative, the existing computer system may not have the processing and memory resources required for the Military Data Link Integration Application. In these cases, the General Purpose Processor module or Image Processing Module can be integrated into any legacy subsystem equipment that has a spare card slot.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A common scalable interface, executing within a computer system having at least one processor, for integrating platform subsystems with a communication subsystem using a full Link 16 message set, the interface comprising:
   an Applications Programming Interface (API) database for defining an interface configuration of each platform subsystem from said platform subsystems;
   a User Modifiable Instructions (UMI) database for defining instructions for implementing the full Link 16 message set for the each platform subsystem;
   application software for automatically configuring itself for the interface configuration of the each platform subsystem; and
   a means for exchanging the full Link 16 messages to and from the communication subsystem and the each platform subsystem.

2. The interface of claim 1 further comprising a Message Parameter Database used by said application software to store Link 16 message data and parameters.

3. The interface of claim 1 wherein said application software comprises processing rules to send and receive Link 16 message data to and from the each platform subsystem in accordance with the interface configuration defined in the API database.

4. The interface of claim 3 wherein said application software comprises a special message functions apparatus.

5. The interface of claim 4 wherein said special message functions apparatus comprises an apparatus for correlating similar Link 16 message data from disparate sources, establishing and updating target track files, formatting of the Link 16 message data into situational awareness display formats, responding to automatic event triggers for message receive and transmit and mission recording and playback.

6. The interface of claim 4 wherein said application software comprises processing rules to apply said special message functions apparatus to the Link 16 message data in accordance with the instructions in the UMI database.

7. The interface of claim 1 wherein said application software comprises processing rules for management of a Link 16 communication network.

8. The interface of claim 1 wherein said application software comprises processing rules for at least one unique host platform requirement.

9. The interface of claim 8 wherein said application software comprises a special platform functions apparatus.

10. The interface of claim 9 wherein said special platform functions apparatus comprises an apparatus for formatting of the Link 15 message data into predefined Link 16 display formats, sending the Link 16 display formats to a display subsystem, and responding to data collection instructions in the UMI database to exchange data with mission applications in the each platform subsystem.

11. A common scalable method, executing within a computer system having at least one processor, for interfacing platform subsystems with a communication subsystem using a full link 16 message set, the method comprising the steps of:
   a) defining a configuration of each platform subsystem from the platform subsystems with a first database;
   b) defining instructions for implementing the full Link 16 message set with a second database;
   c) automatically configuring application software for the each platform subsystem; and
   d) exchanging the Link 16 message data to and from the communication subsystem and the each platform subsystem.

12. The method of claim 11 further comprising the step of reconfiguring the application software for a next platform subsystem.

13. The method of claim 11 further comprising the step of storing the Link 16 message data and parameters in a Message Parameter Database for use by the application software.

14. The method of claim 11 configuring the Link 16 message data to be sent and received using processing rules from the first database.

15. The method of claim 14 where in the step of configuring comprises providing special messaging functions.

16. The method of claim 15 wherein the step of providing special messaging functions comprises the substeps of:
   a) correlating similar Link 16 message data from disparate sources;
   b) establishing and updating target track files;
   c) formatting of the Link 16 message data into situational display formats; and
   d) responding to automatic event triggers for message transmission and receipt and mission recording and playback.

17. The method of claim 15 wherein the step of providing special messaging functions comprises applying the special messaging functions using processing rules from the application software to the Link 16 message data in accordance with the instructions in the second database.

18. The method of claim 11 wherein the step of automatically configuring application software comprises providing processing rules for management of a Link 16 communications network.

19. The method of claim 11 wherein the step of automatically configuring application software comprises providing processing rules for at least one unique host platform requirement.

20. The method of claim 19 wherein the step of proving processing rules comprises:
   a) formatting of data into predefined Link 16 display formats;
   b) sending the Link 16 display formats to a display subsystem; and
   c) responding to data collection instructions in the second database for exchanging the Link 16 message data with at least one mission application in the each platform subsystem.

* * * * *